Nov. 19, 1957     J. KOLODZIEJ     2,813,670
BICYCLE RACK
Filed Feb. 10, 1956
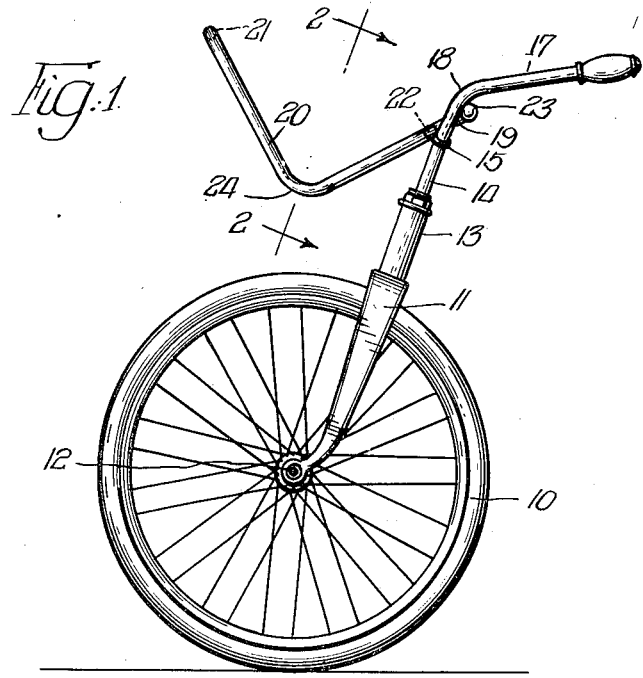
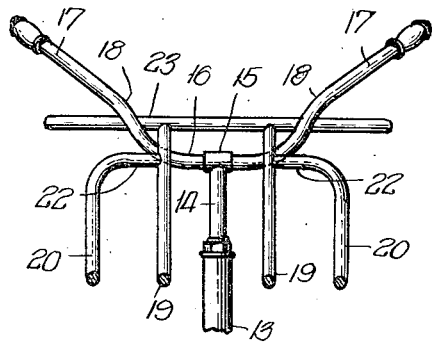
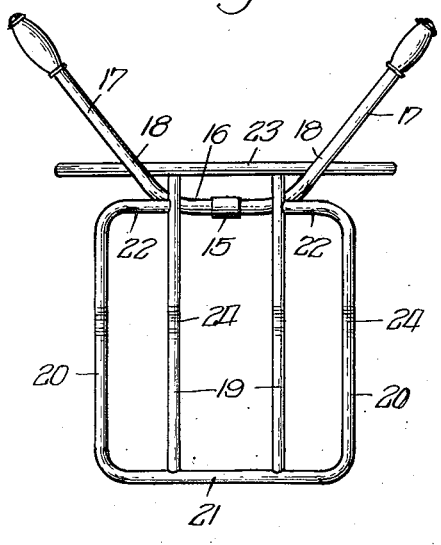
INVENTOR.
John Kolodziej,
BY B. Pelechowicz
Atty.

2,813,670

BICYCLE RACK

John Kolodziej, Chicago, Ill.

Application February 10, 1956, Serial No. 564,697

4 Claims. (Cl. 224—41)

The present invention relates to a bicycle rack, and has for its main object the provision of a rack which may be readily and easily engaged with or disengaged from bicycle handle bars.

Another object of the present invention is the provision of a bicycle rack embodying a plurality of bars, bent intermediately of their ends to define a troughlike basket for supporting thereon for easy transportation various articles such as newspapers and the like, with means provided at one end of the bars whereby the rack may be readily engaged with or disengaged from bicycle handle bars.

A still further object of the present invention is the provision of suitable means at one end of the rack for engaging the rack with bicycle handle bars for interlocking the latter therewith and at the same time maintaining the rack in an operative position with bicycle handle bars.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views;

Fig. 1 is a side elevational view of a bicycle front wheel having usual handle bars for steering the same, with the present rack supported upon the handle bars in its operative position;

Fig. 2 is a front elevational view of the rack, partly in section, when supported in an operative position by and upon the handle bars, the view having been taken upon plane indicated by 2—2 in Fig. 1; and Fig. 3 is the top plan view of the present rack and of the handle bars while the two are interengaged for supporting the rack in its operative position upon the handle bars.

Referring to the present drawing the bicycle with which the present rack is intended to engage, includes wheel 10, fork 11, the free lower ends of which are engaged with and mounted upon wheel axle 12, and tubular member 13 projecting from the upper end of fork 11 and in a rigid engagement therewith. Receivable within said tubular member 13 and rigidly engageable therewith for an upright adjusted relation is steering post 14. The upper end of said steering post 14 is provided with clamp member 15 for engaging and maintaining in an adjusted relation the central horizontal portion 16 of the handle bars of a bicycle. Said tubular member 13 is journalled within a bicycle frame, not shown, for steering wheel 10.

Integrally formed with each end of said central horizontal portion 16 of the handle bars of a bicycle is handle 17, which extends in an upward angular direction with relation to said portion 16, and then is bent rearwardly and effects elbow 18.

The rack constituting the subject matter of this application includes a pair of central bars 19 and a pair of outer bars 20. Integrally formed with the outer free ends of said outer bars 20 is a transverse bar 21, to which the outer free ends of said central bars 19 are welded or otherwise rigidly affixed. The opposite ends of said outer bars 20 are bent towards each other for defining arms 22, which are welded or otherwise rigidly affixed to said central bars 19 in a distanced relation with the adjacent ends of the latter.

Welded or otherwise rigidly affixed to the latter ends of said central bars 19 is a transverse bar 23, the ends of which extend beyond said outer bars 20.

Intermediately of their ends bars 19 and 20 are bent substantially at right angle, defining elbows 24. By virtue of this construction said bars 19 and 20 define a basket or a cradle for supporting and carrying various articles such as newspapers and the like.

As is clearly seen in Figs. 2 and 3, arms 22 and transverse bar 23 are in a spaced relation for defining recesses on each side of said central bars 19 for accommodating therewithin handles 17 of the bicycle handle bars. In the operative position of the rack with the handle bars said transverse bar 23 reposes rearwardly of the vertical portions of handles 17 which immediately extend from said central horizontal portion 16, and below elbows 18. The adjacent ends of said central bars 19 and the inner ends of arms 22 rest forwardly upon the ends of said central horizontal portion 16 of the handle bars or upon the portions of handles 17 which are in the immediate proximity to the ends of said central horizontal portion 16. By virtue of this positional relation between the rack and the handle bars the rack is suspended upon the handle bars and is maintained in its operative relation therewith, as best shown in Fig. 1.

To remove the rack from the engagement with the bicycle handle bars all that is required to be done is to raise the rack in an upward direction, until the rear portion thereof, that is the portion rearwardly past said elbow 24, remains in a substantially horizontal position. Shifting of the rack in a rearward direction, will shift said transverse bar 23 along handles 17, and twisting the rack to a lateral direction will clear one end of said bar 23 from the adjacent handle 17. Thereupon the rack may be lifted from the bicycle handle bars.

Although a pair of said central bars 19 is preferable, it is nevertheless to be understood that even one central bar 19, or any other number in excess of two will answer the purpose. Essentially the rack consists of at least on central bar 19, a pair of outer bars 20, with arms 22 connecting the outer bars 20 with at least one central bar 19, when only one of said central bars 19 is used, and otherwise when two of said central bars 19 are employed, then said arms 22 connect with each of said central bars 19. Another essential feature of the rack is the spaces or recesses defined by said arms 22 and the transverse bar 23 on each side of central bar 19, if only one central bar 19 is used, or on each side of outermost central bars 19, when two or more of said central bars are employed, for reception and accommodation therewithin of handles 17 for interlocking the rack with the bicycle handle bars.

While there is described herein preferred embodiment of the present invention, it is nevertheless to be understood that minor changes may be made therein without departing from the spirit and scope of the invention as claimed.

What I claim as new is:

1. A detachable rack for engagement with bicycle handle bars comprising a central bar means, a pair of outer bars substantially in a parallel relation with said central bar, arms extending from one end of said outer bars substantially in a perpendicular relation therewith, said arms being connected with said central bar means, and a straight line transverse bar carried by one end of said central bar means and extending laterally outwardly therefrom, said arms and said transverse bar being spaced for defining a recess on each side of said central bar means for reception therewithin of the bicycle handle bars.

2. A detachable rack for engagement with bicycle handle bars comprising a pair of central bars, a pair of outer bars substantially in a parallel relation with said central bars, arms extending from the ends of said outer bars substantially in a perpendicular relation therewith in the plane of said outer and central bars, said arms being connected with said central bars, and a transverse bar carried by one end of said central bars, said arms and said transverse bar being spaced for defining a recess on each side of said central bars for reception therewithin of the bicycle handle bars.

3. A detachable rack for engagement with bicycle handle bars comprising a plurality of central bars, a pair of outer bars substantially in a parallel relation with said central bars, said central bars and said outer bars being upon a common plane, arms extending from the ends of said outer bars substantially in a perpendicular relation therewith and in said common plane, said arms by their inner ends being connected with the outermost of said central bars in a spaced relation with one end thereof, and a transverse bar carried by said end of said central bars, said arms and said transverse bar being in a spaced relation for defining a recess on each side of the outermost of said central bars for reception therewithin of the bicycle handle bars.

4. A detachable rack for engagement with bicycle handle bars comprising a plurality of central bars, a pair of outer bars substantially in a parallel relation with said central bars, arms extending from one end of said outer bars substantially in a perpendicular relation therewith, said arms by their inner ends being connected with the outermost of said central bars in a spaced relation with one end thereof, and a transverse bar carried by said ends of said central bars, said central bars, said outer bars, said arms and said transverse bar being upon a common plane, said arms and said transverse bar being in a spaced relation for defining a recess on each side of the outermost of said central bars for reception therewithin of the bicycle handle bars, said central bars and said outer bars intermediately of their ends being angularly bent upon transversely alined points for defining a cradle.

References Cited in the file of this patent

UNITED STATES PATENTS

| | | |
|---|---|---|
| 505,360 | Hilliard | Sept. 19, 1893 |
| 607,782 | Erwin | July 19, 1898 |
| 671,295 | Peterson | Apr. 2, 1901 |
| 1,580,847 | Moineau | Apr. 13, 1926 |
| 2,198,584 | Swably | Apr. 23, 1940 |

FOREIGN PATENTS

| | | |
|---|---|---|
| 516,942 | Great Britain | Jan. 16, 1940 |